W. L. Whittaker,
Horse-Collar Machine,
Nº 12,494.    Patented Mar. 6, 1855.
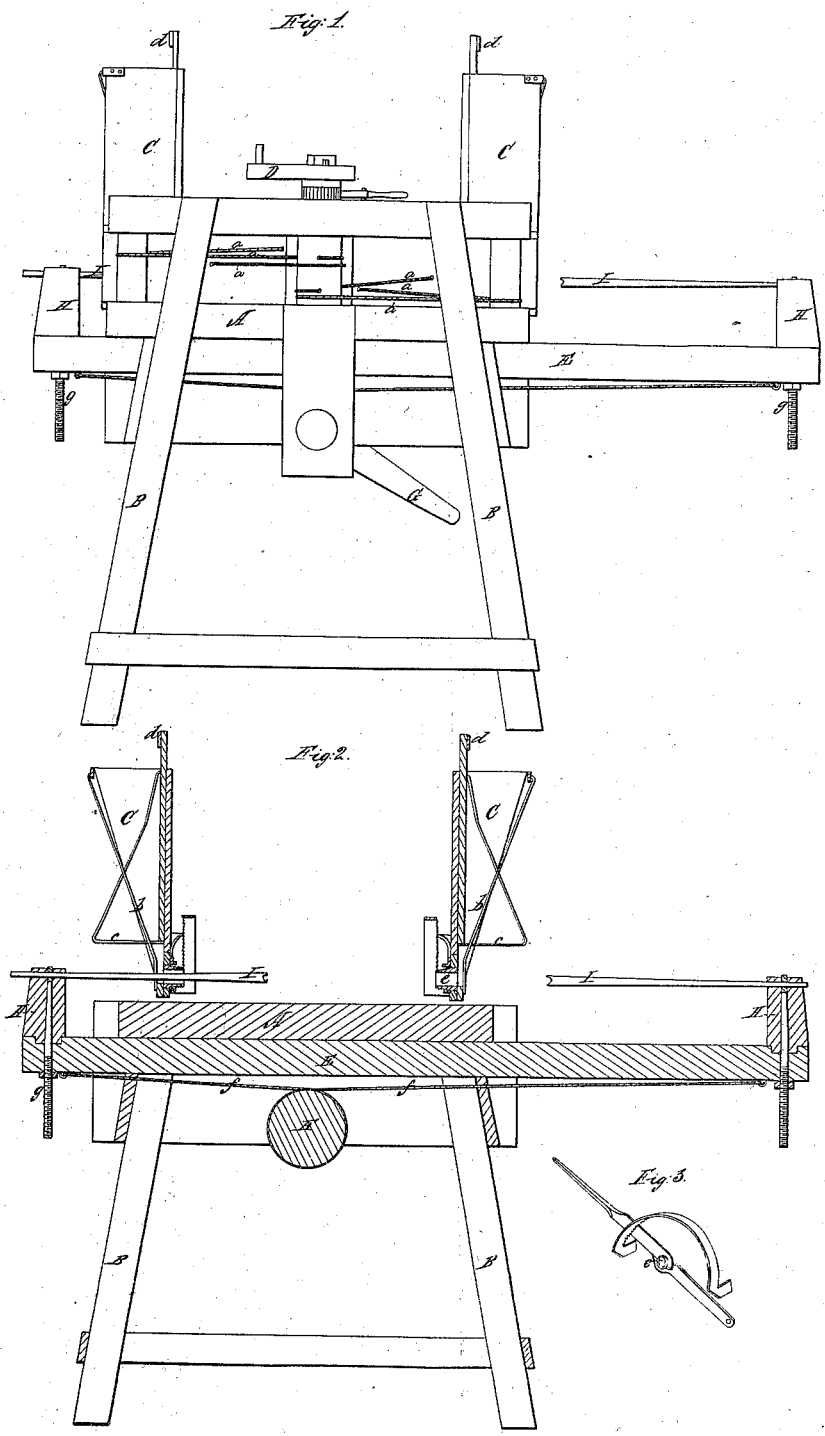

UNITED STATES PATENT OFFICE.

WILLIAM L. WHITTAKER, OF CUMBERLAND, MARYLAND.

MACHINE FOR STUFFING HORSE-COLLARS.

Specification of Letters Patent No. 12,494, dated March 6, 1855.

*To all whom it may concern:*

Be it known that I, WM. L. WHITTAKER, of Cumberland, in the county of Allegany and State of Maryland, have invented certain new and useful Improvements in Machines for Stuffing Horse-Collars; and I do hereby declare the following to be a full, clear, and exact description of the same, reference being had to the accompanying drawings, making a part thereof, in which—

Figure 1 represents a view from one of the sides of the machine. Fig. 2 represents a vertical longitudinal section through the machine, and Fig. 3 represents a perspective of one of the clamps detached.

Similar letters in the figures refer to like parts.

The nature of my invention consists first in a weighted rack in the straw hoppers, the fingers of which are arranged to work between the ribs or slats of the hopper, for the purpose of feeding down the straw in said hoppers so that the stuffing rods will always take in a regular quantity of straw at each operation of them. And also in stuffing the collar simultaneously from both of its ends, by rods which have a motion past each other for the purpose of lapping the straw throughout the entire length of the collar.

To enable others skilled in the art to make and use my invention, I will proceed to describe the same with reference to the drawings.

A is a table substantially supported on legs B. On this table are arranged the two hoppers C, C, sliding in ways in said table so that by means of a winch D and cords $a$ $a$, &c., attached to the drum of said winch and to said hoppers, they (the hoppers) may be moved from or toward each other on said table. The hoppers as seen in Fig. 2, are funnel shaped so as to contain but little straw at the point where the stuffing rods pass through them, and not clog the rods. The outer sides of the hoppers are inclined (the inner sides being vertical) and are composed of rods or wires $b$, between which pass an inverted rack as it were, its base $c$ projecting out and resting on the straw. This inner or inverted rack is weighted by a bar $d$, or its own weight may be made sufficient, which causes it at all times to press equally on the straw and carry it down to where the stuffing rods pass through the hopper, and thus keep a regular supply of straw at that point to take the place of that carried into the collar.

On each inner face of the hopper is arranged a clamp, for holding the collar to be stretched. This clamp is better seen in Fig. 3, where the hole $e$, represents the opening for the stuffing rods to pass through, that being opposite the open end of the collar. The collar is first secured by its ends to the clamps on each hopper, and then the hoppers are run apart by the winch D, until sufficient strain is upon the collar to hold it in a straight position, the drum of the winch being held by a ratch and dog, in any of the well known ways. It is then ready to be stuffed.

A long reciprocating bar E, passes underneath the table A, which is connected to a drum F, by the cords $f, f$. On this drum F is a crank G, by the turning of which first in one direction, and then reversing it and turning it in the other direction, gives the necessary reciprocating motion to the bar E. Upon upright pieces H, H, at each end of this bar, is arranged one on each, a stuffing bar or rod I, forked at that end which passes into the collar, for catching and carrying in the straw, as they pass through their hoppers, and on their return leaving it there, the weighted rack within the hoppers constantly pressing down straw from above to take the place of that carried into the collar. These stuffing rods are made adjustable in their uprights by set screws $g, g$, and can be made to travel past each other in the collar, so that the straw shall be lapped therein.

The usual plan heretofore adopted of stuffing collars, has been invariably to stuff one half from one end, then turn around the collar, attach, and stuff the other half. It is evident that by this mode the straw is not lapped in the middle, though it might be at or near the ends. My machine is not therefore a duplication of what has heretofore been used, because it does what the other could not do, viz: lap the straw equally all the way through, and while it stuffs both ends in the same time that the other machines did one end, it also makes a better center than could be done in the old way.

I am aware that a hinged rack inside of a hopper has been used which the inventor states can be moved up or down to change the quantity which the stuffing rods are to carry into the collar. It is not clear how it was done, but it differs from my plan which keeps a regular and unvarying quantity at the spot which the rods pass through. It is deemed therefore new in its special application. I am also aware that a collar has been stretched while it was being filled from one end only. This is not any part of my invention because the same difficulty arises as to its susceptibility of having the straw lapped.

Having thus fully described the nature of my invention what I claim therein as new and desire to secure by Letters Patent, is—

1. In combination with the hoppers the weighted racks for bringing down a regulated quantity of straw to take the place of that carried into the collar by the stuffing rods, as set forth.

2. I also claim stuffing the collar simultaneously from both ends, by means of stuffing rods which travel past each other at the center of the collar, by which means the straw is evenly lapped at the center as at the ends, substantially as described.

WILLIAM LEVI WHITTAKER.

Witnesses:
J. B. WIDENER,
J. W. STRONG.